United States Patent
Osakabe et al.

(10) Patent No.: US 9,019,582 B2
(45) Date of Patent: Apr. 28, 2015

(54) IMAGE READING APPARATUS

(71) Applicants: Yoshinori Osakabe, Seto (JP); Katsuro Miura, Toyota (JP); Takuya Naniwa, Kiyosu (JP)

(72) Inventors: Yoshinori Osakabe, Seto (JP); Katsuro Miura, Toyota (JP); Takuya Naniwa, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/081,606

(22) Filed: Nov. 15, 2013

(65) Prior Publication Data
US 2014/0139889 A1 May 22, 2014

(30) Foreign Application Priority Data
Nov. 16, 2012 (JP) .................................. 2012-252484

(51) Int. Cl.
| H04N 1/46 | (2006.01) |
| H04N 1/00 | (2006.01) |
| H04N 1/10 | (2006.01) |
| H04N 1/193 | (2006.01) |
| H04N 1/203 | (2006.01) |

(52) U.S. Cl.
CPC ........... *H04N 1/0083* (2013.01); *H04N 1/1017* (2013.01); *H04N 1/193* (2013.01); *H04N 1/2034* (2013.01); *H04N 2201/0081* (2013.01)

(58) Field of Classification Search
USPC .................................. 358/530, 3.32, 401, 408
See application file for complete search history.

(56) References Cited

U.S. PATENT DOCUMENTS

| 2008/0225348 A1 | 9/2008 | Kubo et al. |
| 2013/0265621 A1 | 10/2013 | Kubo et al. |
| 2013/0278977 A1 | 10/2013 | Kubo et al. |

FOREIGN PATENT DOCUMENTS

| JP | 2008-228044 A | 9/2008 |
| JP | 2012-023782 A | 2/2012 |

*Primary Examiner* — Jamares Q Washington
(74) *Attorney, Agent, or Firm* — Banner & Witcoff, Ltd.

(57) ABSTRACT

When the two same CIS are used for a first image sensor and a second image sensor and they are arranged to face opposite sides of an original document with longer sides (i.e., a main scanning direction) thereof being aligned, if an arrangement order of the array of the imaging elements and the light guiding unit in a document conveying direction is the same, the connectors are located at opposite side ends in a front-rear direction. Thus, an electric cable connected to the connector of the second image sensor is arranged above the second image sensor and extends in a longitudinal direction. Additionally, a horizontal portion of the electric cable is supported on an upper surface of a casing accommodating the second image sensor.

5 Claims, 8 Drawing Sheets

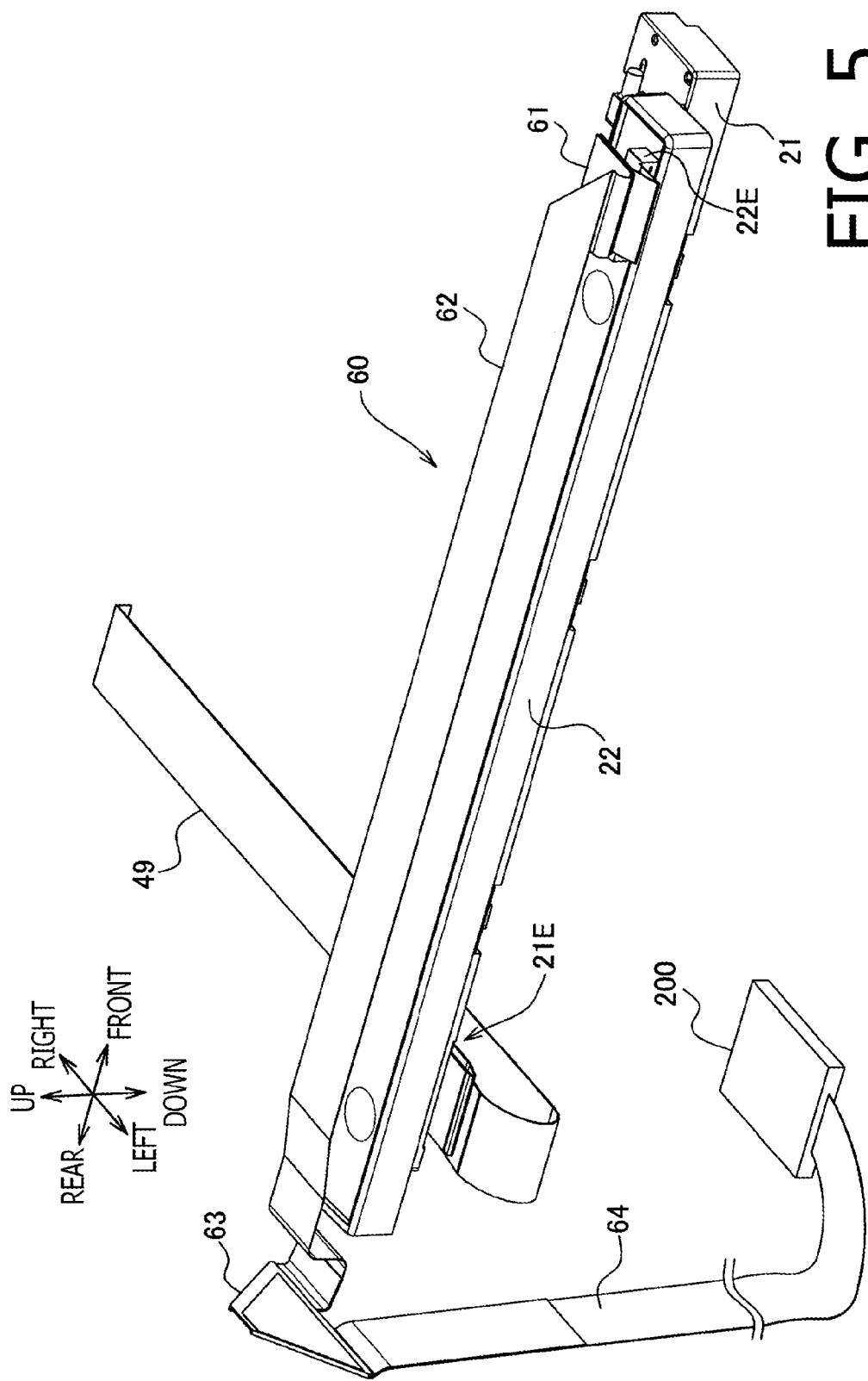

US 9,019,582 B2

IMAGE READING APPARATUS

CROSS-REFERENCE TO RELATED APPLICATION

This application claims priority under 35 U.S.C. §119 from Japanese Patent Applications No. 2012-252484 filed on Nov. 16, 2012. The entire subject matter of the application is incorporated herein by reference.

BACKGROUND

1. Technical Field

An aspect of the present invention relates to an image reading apparatus configured to read an image from a sheet of original document being conveyed. Specifically, the aspect of the present invention relates to an image reading apparatus including a first reading unit configured to read an image from one side of the original document being conveyed and a second reading unit configured to read an image from the other side of the original document being conveyed.

2. Related Art

Conventionally, there has been suggested a contact image sensor (hereinafter, referred to as "CIS") including an array of a plurality of imaging elements, a light guiding unit and a connector. The light guiding unit is arranged parallelly with the array of imaging elements, and the connector is disposed at one end portion of the array of imaging elements and outputs signals from the imaging elements. There has also been suggested an image reading apparatus configured to read an image, with the CIS, from original document being conveyed by rollers. In the image reading apparatus, images are read from both sides of the original document with two CISs and positional relationships of the array of imaging elements, the light guiding unit and the connector in the two CISs are the same.

SUMMARY

When the images are read from the both sides of the original document with the two CISs with the positional relationships of the array of imaging elements, light guiding unit and the connector being the same, it is desired to employ the same sensors for the CISs in order to suppress a manufacturing cost.

In order to arrange the two same CISs to face each other with a document conveyer path located therebetween, the following arrangement may be possible. That is, if the two CISs are arranged to face each other such that arrangement orders of the array of the imaging elements and the light guiding unit of them in a document conveying direction are the same, the connectors of the CISs are located on opposite side ends in the longitudinal direction thereof. In this regard, a state where the arrangement orders of the array of the imaging elements and the light guiding unit of the CISs in the document conveying direction are the same means a positional relationship of the array of the imaging elements S and the light guiding unit LG of a first image sensor 21 in a right-left direction is the same as the positional relationship of the array of the imaging elements S and the light guiding unit LG of a second image sensor 22 in the right-left direction as depicted in FIG. 7.

On the other hand, when the two CISs are arranged to face each other such that the connectors thereof are located on the same side ends in the longitudinal direction thereof, the arrangement order of the array of imaging elements and the light guiding unit, in the document conveying direction, of one of the CISs is reversed with respect to that of the other one of the CISs. In other words, when the same sensors are used for the two CISs and they are arranged to face each other with the conveyer path located therebetween, the arrangement order of the array of the imaging elements and the light guiding unit in the document conveying direction, or the position of the connector in the longitudinal direction is reversed between the two CISs. It is noted that the longitudinal direction of the first image sensor 21 and the second image sensor 22 is a direction orthogonal to the document conveying direction and parallel to a surface of the original document to be conveyed.

If the arrangement orders of the array of the imaging elements and the light guiding unit in the document conveying direction are reversed between the two CISs, there is a problem that it is difficult to detect a leading end and a trailing end of the original document. Specifically, when the arrangement orders are reversed, the imaging elements of one of the CISs receives reflected light which is reflection of light emitted from the upstream side to the downstream side in the document conveying direction, while, the imaging elements of the other one of the CISs receives reflected light which is reflection of light emitted from the downstream side to the upstream side in the document conveying direction. As a result, different positions are detected as an end of the original document by the two CISs. Thus, the precise detection of the leading end and the trailing end of the original document becomes difficult. This problem is particularly significant when a document subject to scanning is thick. Additionally, if the arrangement orders of the array of the imaging elements and the light guiding unit in the document conveying direction are reversed between the two CISs, additional processes such as a process to rotate the image data which has been read by the one of the CISs 180 degrees before image recording.

However, if the position of the connector in the longitudinal direction is reversed between the two CISs, there is also a problem that arrangement of electric cables which transmits signals from the connectors becomes difficult.

Aspects of the present invention provides an improved image reading apparatus including two reader units with positional relationships of an array imaging elements, a light guiding unit and a connector being the same configured to read images from both sides of original document, in which an arrangement of electric cables can be made easily if the arrangement orders of the array of the imaging elements and the light guiding unit in a document conveying direction are the same therebetween.

According to an aspect of the present invention, an image reading apparatus including a conveyance unit configured to convey original documents in a document conveying direction, a first reader unit and a second reader unit is provided. The first reader unit includes a first array of imaging elements in which imaging elements are aligned in a predetermined direction, a first light guiding unit arranged parallelly with the first array of imaging elements and a first connector disposed in one end of the first array of imaging elements. Additionally, the first reader unit is configured to read an image from one side of the original document conveyed by the conveyance unit with the first array of imaging elements. The second reader unit includes a second array of imaging elements in which imaging elements are aligned in the predetermined direction, a second light guiding unit arranged parallelly with the second array of imaging elements and a second connector disposed in one end of the second array of imaging elements. A positional relationship of the second array of imaging elements, the second light guiding unit and the second connector being the same as a positional relationship of the first array of imaging elements, the first light guiding unit and the first connector, and the second reader unit is arranged such that the second connector and the first connector being located at opposite side ends in the predetermined direction. The image reading apparatus further includes a first electric cable connected to the first connector and configured to transmit signals from the first array of imaging elements, a second electric cable connected to the second connector and configured to transmit signals from the second array of imaging elements, and a supporting unit configured to support one of the first electric cable and the second electric cable along the predetermined direction such that the first electric cable and the second electric cable become aligned together.

BRIEF DESCRIPTION OF THE ACCOMPANYING DRAWINGS

FIG. 5 is a perspective view showing an arrangement of electric cables and image sensors in the image reader unit.

DETAILED DESCRIPTION

Hereinafter, an embodiment according to aspects of the invention will be described with reference to the accompany drawings. An multifunction device (hereinafter, referred to as "MFD") 1 according to an embodiment of the present invention is equipped with a plurality of functions including a function as an image reading apparatus (i.e., a scanning function) and other functions (e.g., a printing function, a copying function and a facsimile transmission/receiving function).

In the embodiment described below, directions concerning the MFD 1 and positional relationships among components of the MFD 1 will be referred to based on orientations indicated by arrows shown in each drawing. In this regard, a right-to-left or left-to-right direction of the MFD 1 may be referred to as a right-left direction. An up-to-down or down-to-up direction may be referred to as an up-down direction. The front-to-rear or rear-to-front direction may be referred to as a front-rear direction.

Figure 1:
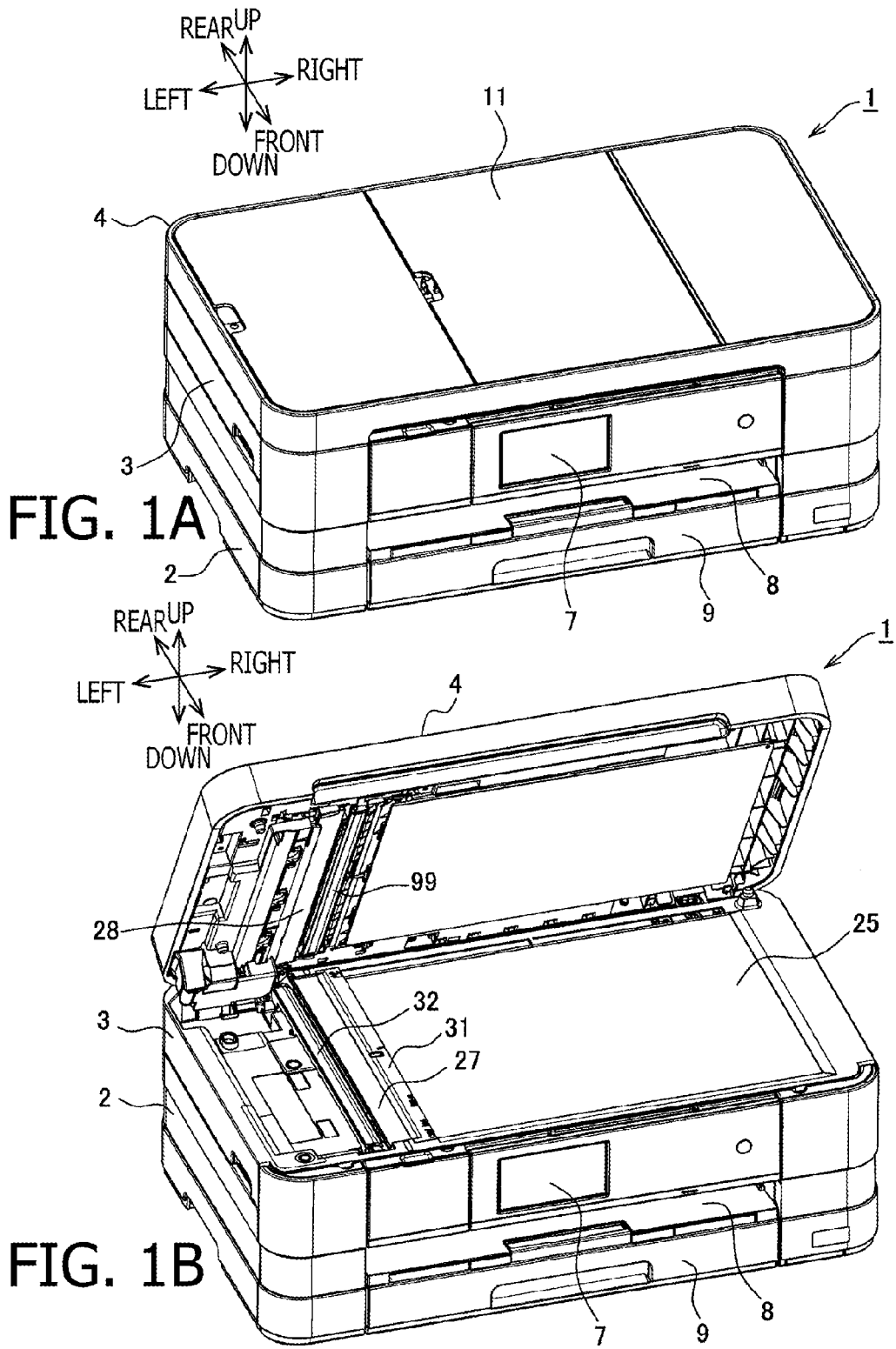
FIGS. 1A and 1B are perspective views showing a multifunction device according to an embodiment of the present invention, when a document cover is closed (FIG. 1A) and opened (FIG. 1B).

As depicted in FIG. 1A, the MFD 1 includes an image forming unit 2, an image reader unit 3 and a document cover 4. The image reader unit 3 is arranged in an upper position with respect to the image forming unit 2. The document cover 4 is arranged in an upper position with respect to the image reader unit 3. As depicted in FIG. 1B, the document cover 4 is configured to rotate, with hinges 10 (see FIG. 6), about an axis defined in the vicinity of a rear side of an upper surface of the image reader unit 3. The document cover 4 is openable and closable (i.e., movable between an open position shown in FIG. 1A and a closed position shown in FIG. 1B). The image reader unit 3 is configured to rotate about an axis defined in the vicinity of a rear side of an upper surface of the image forming unit 2. The image reader unit 3 is configured to be openable and closable, that is, movable between a closed position as shown in FIG. 1A, in which the upper surface of the image forming unit 2 is covered with the image reader unit 3, and an open position (not shown) in which the upper surface of the image forming unit 2 is exposed.

The image forming unit 2 includes components such as a printer engine (not shown), a processing unit 200 (see FIG. 5) and etc. Each component included in the image forming unit 2, the image reader unit 3 and the document cover 4 is controlled by the processing unit 200 of the image forming unit 2.

When the document cover 4 is moved from the closed position to the open position, a platen (i.e., an upper surface of a transparent portion 25 described later) arranged on the top of the image reader unit 3 is exposed as depicted in FIG. 1B. When the document cover 4 is moved from the open position to the closed position, the platen is covered by the document cover 4 as depicted in FIG. 1A.

An operation panel 7 to be operated by a user is disposed on an upper front side of the image forming unit 2. Additionally, a printed sheet outlet 8, through which a printed medium is ejected, is formed below the operation panel 7. Further, a sheet-feed cassette 9 is arranged below the printed sheet outlet 8. In other words, the printed sheet outlet 8 is arranged between the operation panel 7 and the sheet-feed cassette 9.

Figure 2:
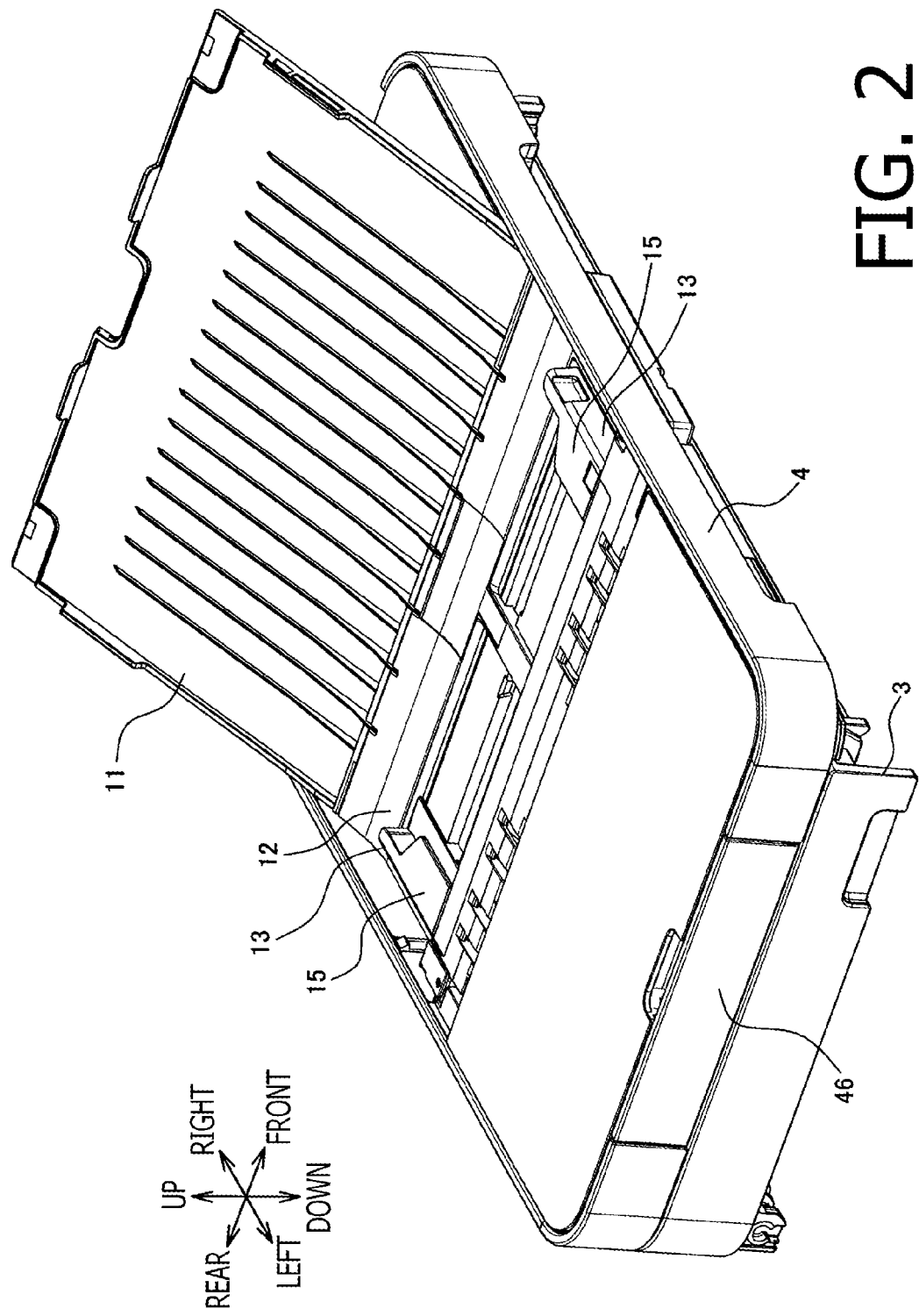
FIG. 2 is a perspective view showing an image reader unit of the multifunction device with a feeding unit of the image reader unit being in use.

As depicted in FIG. 1A and FIG. 2, an upper cover 11, which is openable/closeable with respect to the document cover 4, is disposed on top of the document cover 4. The upper cover 11 is configured to be rotatable about an axis, which is defined at a position in the vicinity of a right end of the upper cover 11 and extends in the front-rear direction. When the upper cover 11 is in the closed position, a bottom surface of the upper cover 11 is directed downward as depicted in FIG. 1A. When the upper cover 11 is rotated from the closed position to the open position by the user, the bottom surface of the upper cover 11 is directed obliquely to an upper right direction as depicted in FIG. 2. In this state, a document tray 12 on the top of the document cover 4 is exposed to outside.

On the document tray 12, a pair of document guiding pieces 13, which guide the original document in the right-left direction by holding the original document in the front-rear direction, are disposed. The pair of document guiding pieces 13 have well know configurations so that they can slide in the front-rear direction in conjunction with each other. Specifically, when one of the document guiding pieces 13 slides in one direction, another document guiding piece 13 slides in a direction opposite to the one direction. According to this configuration, the user can slide the pair of document guiding pieces 13 to be closer to and farther from each other by operating one of the document guiding pieces 13 so as to change an interval therebetween.

A partition plate 15 is disposed on an upper end of the document guiding pieces 13. The original document to be read is set below the partition plate 15. The original document is then fed and conveyed along a document conveyer path as described later, and ejected above the partition plate 15.

Details of Image Reader Unit and Document Cover

Figure 3:
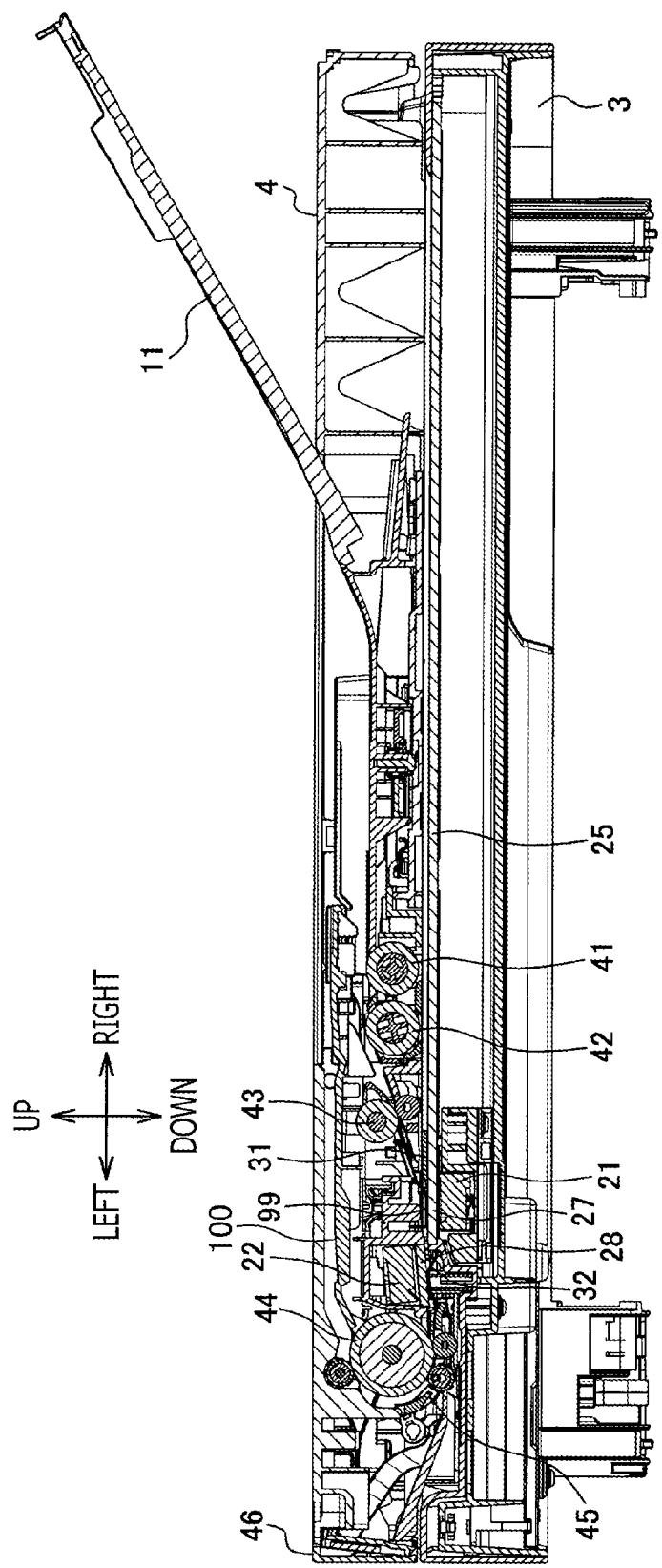
FIG. 3 is a cross-sectional side view showing a configuration of the image reader unit.

FIG. 3 is a center cross-sectional side view of the image reader unit 3 and the document cover 4 with the document cover 4 being in the closed position with respect to the image reader unit 3 and the upper cover 11 being in the open position with respect to the document cover 4. That is, FIG. 3 is a view showing a cross-sectional surface viewed from a front side and sectioned along the right-left direction at substantially a center of the image reader unit 3 and the document cover 4 shown in FIG. 2. As depicted in FIG. 3, the image reader unit 3 includes a first image sensor 21 and the document cover 4 includes a second image sensor 22. In the present embodiment, contact image sensors are employed to serve as the first image sensor 21 and the second image sensor 22.

The first image sensor 21 is driven by a motor (not shown) to reciprocates inside the image reader unit 3 in the right-left direction (i.e., a sub scanning direction). On the other hand, the second image sensor 22 is fixed on a frame of the document cover 4.

The transparent portion 25 and a first transparent portion 27 are disposed above a reciprocating path of the first image sensor 21 of the image reader unit 3. In addition, a second transparent portion 28 is disposed below the second image sensor 22 of the document cover 4.

The transparent portion 25 and the first transparent portion 27 are arranged to form the upper surface of the image reader unit 3. In the present embodiment, the transparent portion 25 and the first transparent portion 27 are formed by a single glass plate. Additionally, in the present embodiment, the second transparent portion 28 is formed by a glass plate separately from the transparent portion 25 and the first transparent portion 27 (see FIG. 1B).

As depicted in FIG. 1B, a document positioning plate 31 is disposed adjacent to the first transparent portion 27 in the image reader unit 3. The document positioning plate 31 is used for positioning the original document on the transparent portion 25 or checking a size of the original document. A first white reference plate is disposed on a rear surface (i.e., a bottom surface) of the document positioning plate 31. In the present embodiment, the first white reference plate is a white tape or a white plate attached to the rear surface (the bottom surface) of the document positioning plate 31. Alternatively, the rear surface (the bottom surface) of the document positioning plate 31 as is may be used as the first white reference plate. In this case, the rear surface (the bottom surface) of the document positioning plate 31 may be painted in white or the document positioning plate 31 may be made of a white material. It is noted that the reference number "31" is also applied to the first white reference plate herein after. The first white reference plate 31 is used when the first image sensor 21 performs a shading correction.

Additionally, in the image reader unit 3, a second white reference plate 32 is disposed to face the second transparent portion 28 of the document cover 4 when the document cover 4 is in the closed position. The second white reference plate 32 is used when the second image sensor 22 performs a shading correction. In the present embodiment, the second white reference plate 32 includes a pressing plate and a white tape or a white plate. The pressing plate is to press the original document toward the second transparent portion 28 on the second image sensor 22 side. The white tape or a white plate is attached to of a surface (i.e., a surface which presses the original document toward the second transparent portion 28 on the second image sensor 22 side) of the pressing plate. Alternatively, the pressing plate of the second white reference plate 32 may be painted in white or may be made of a white material instead of attaching the white tape or the white plate.

Further, the image reader unit 3 includes a pressing plate 99 to press the original document toward the first image sensor 21. Therefore, the pressing plate 99 may be used as the first white reference plate 31. In this case, similarly to the second white reference plate 32, a white tape or a white plate may be attached to a bottom surface of the pressing plate 99 or the pressing plate 99 may be formed in white. That is, the pressing plate 99 may be painted in white or may be made of a white material instead of attaching the white tape or the white plate.

It is noted that the transparent portion 25 and the first transparent portion 27 may be formed by separate glass plates instead of the single glass plate. Further, the transparent portion 25, the first transparent portion 27 and the second transparent portion 28 may be made of any materials other than glass providing that the original document can be read by the first image sensor 21 and the second image sensor 22.

As depicted in FIG. 3, the document cover 4 includes rollers such as a feed roller 41, a separator roller 42, a conveyer roller 43 and a reverse conveyer roller 44. Additionally, members having guiding faces to guide the original document to an appropriate conveying direction are disposed between the rollers. As one of the members having the guiding faces, a path switching member 45 which is movable and disposed on a left side of the reverse conveyer roller 44 is provided.

The path switching member 45 is movable, with respect to the document cover 4, to rotate about an axis extending in the front-rear direction on the lower end side of the path switching member 45. Additionally, an openable and closeable cover 46 is disposed on an outer surface of the document cover 4 on the left side of the reverse conveyer roller 44.

In the present embodiment, an image formed on the original document will be read as described below while the original document is conveyed in the document cover 4. Specifically, when the rollers included in the document cover 4 are driven, the original documents fed by the feed roller 41 from an upstream side in the conveying direction are separated one-by-one by the separator roller 42, and conveyed to a downstream side in the conveying direction.

Subsequently, the original document is further conveyed by the conveyer roller 43 to the downstream side in the conveying direction, and passes through a first reading position which faces the first image sensor 21 across the first transparent portion 27. Then, the original document passes through a second reading position which faces the second image sensor 22 across the second transparent portion 28 and is further conveyed by the reverse conveyer roller 44.

In this regard, if the path switching member 45 and the cover 46 are positioned as shown in FIG. 3, the original document is reversed and conveyed by the path switching member 45, and ejected above the partition plate 15. On the other hand, if the path switching member 45 and the cover 46 are moved to rotate from the position shown in FIG. 3 in a counterclockwise direction, the original document is ejected to the left side of the document cover 4 directly (so-called a straight ejection). The straight ejection is used when the original document is a thicker paper such as a business card or a post card. It is noted that the cover 46 is not shown in FIGS. 1A and 1B.

Further, if reading of an image from one side of the original document is designated, the image of the original document which passes through the first reading position is read by the first image sensor 21 during the conveyance of the original document. On the other hand, if reading of images from both sides of the original document is designated, the images formed on both sides of the original document which pass through the first reading position and the second reading direction are respectively read, in parallel operation, by the first image sensor 21 and the second image sensor 22 during the conveyance of the original document.

Arrangement of Image Sensor and Electric Cable

According to the embodiment, by employing the same sensor for both the first image sensor 21 and the second image sensor 22, a manufacturing cost is suppressed. When the same contact image sensors are used, a positional relationship between an array of a plurality of imaging elements of the sensor, a light guiding unit and components such as a connector is the same between the first image sensor 21 and the second image sensor 22. As described above, the array of imaging elements constitutes the sensor, the light guiding unit is arranged parallelly with the array of imaging elements, and the connector is disposed at one end portion of the array of imaging elements and outputs signals from the imaging elements.

Since the same sensors are used, when the first image sensor 21 and the second image sensor 22 are arranged to face opposite sides of the original document with longer sides (i.e., a main scanning direction) thereof being aligned in the front-rear direction as described above, an arrangement order of the array of the imaging elements S and the light guiding unit LG in the document conveying direction (see FIG. 7) is reversed or connectors 21E and 22E of the first image sensor 21 and the second image sensor 22 (see FIGS. 4A, 4B and 5) are located at opposite side ends in the front-rear direction.

Figure 7:
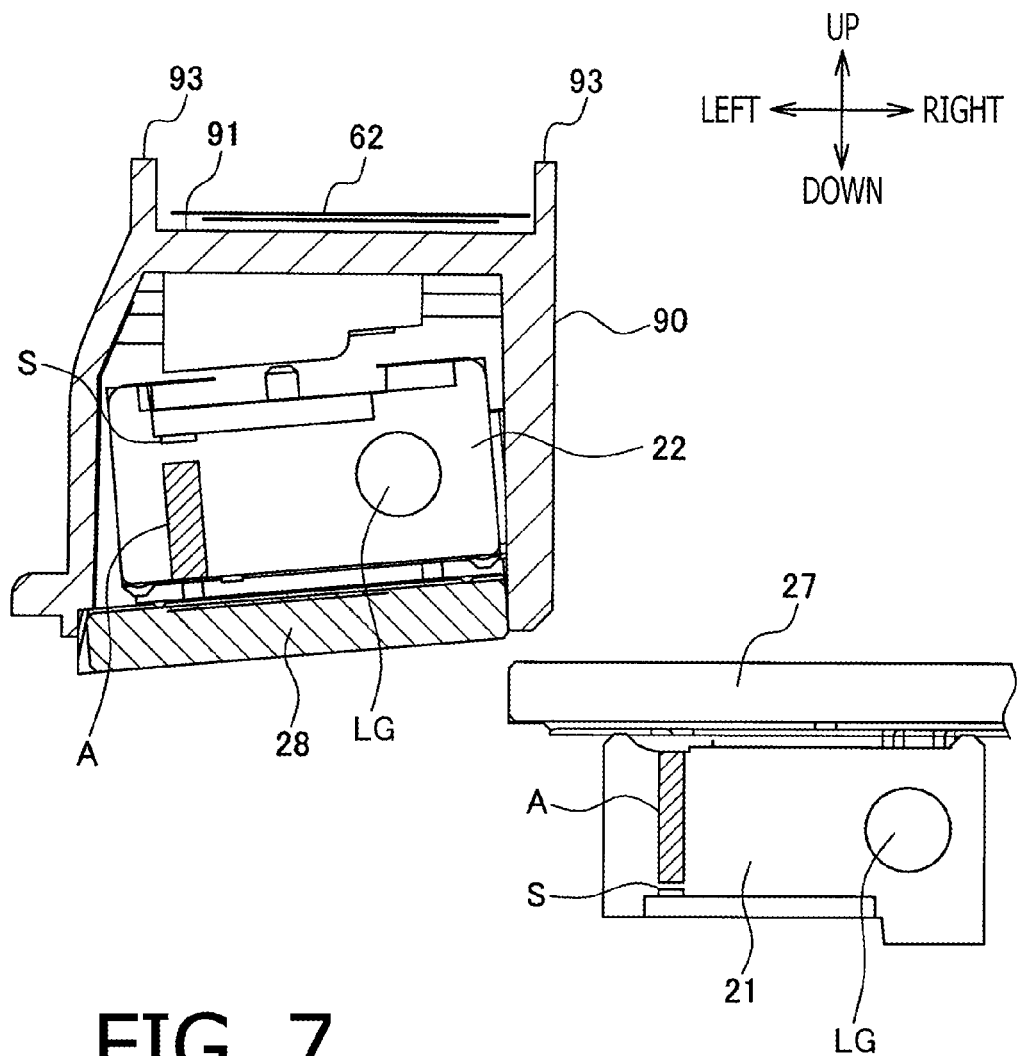
FIG. 7 is an enlarged cross-sectional view showing a configuration of a casing supporting the electric cable.

Specifically, when the first image sensor 21 and the second image sensor 22 are arranged to face each other such that the arrangement order of the array of the imaging elements and the light guiding unit of the first image sensor 21 in the document conveying direction is the same as that of the second image sensor 22, the connectors of the first image sensor 21 and the second image sensor 22 are located on opposite side ends in the longitudinal direction thereof. In this regard, a state where the arrangement order of the array of the imaging elements and the light guiding unit of the first image sensor 21 and that of the second image sensor 22 in the document conveying direction is the same means a positional relationship of the array of the imaging elements and the light guiding unit of the first image sensor 21 in the right-left direction is the same as the positional relationship of the array of the imaging elements and the light guiding unit of the second image sensor 22 in the right-left direction as depicted in FIG. 7.

On the other hand, when the first image sensor 21 and the second image sensor 22 are arranged such that the connectors thereof are located on the same side ends in the longitudinal direction of the first image sensor 21 and the second image sensor 22, the arrangement order of the array of imaging elements and the light guiding unit, in the document conveying direction, of the first image sensor 21 is reversed with respect to that of the second image sensor 22. In other words, when the same sensors are used as the first image sensor 21 and the second image sensor 22 and they are arranged to face each other with the conveyer path located therebetween, the arrangement order of the array of the imaging elements and the light guiding unit in the document conveying direction, or the position of the connector in the longitudinal direction is reversed between the first image sensor 21 and the second image sensor 22. It is noted that the longitudinal direction of the first image sensor 21 and the second image sensor 22 is a direction orthogonal to the document conveying direction and parallel to a surface of the original document to be conveyed.

Figure 4A:
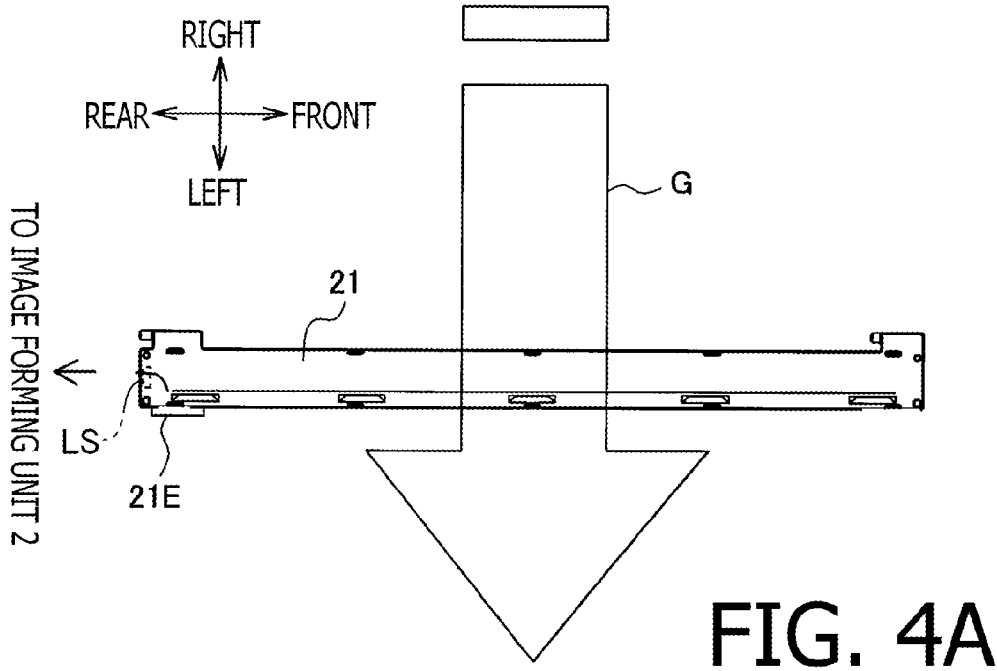
FIGS. 4A and 4B are plain views showing an arrangement of image sensors in the image reader unit.
Figure 4B:
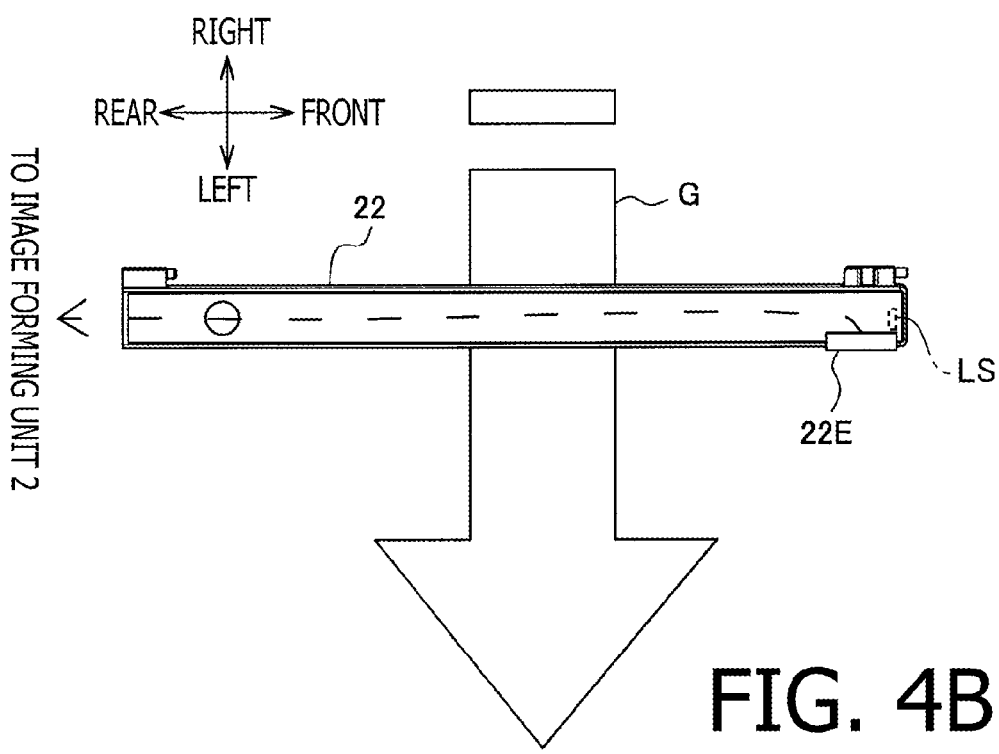

If the arrangement orders of the array of the imaging elements S (more precisely, a line sensor with the imaging elements S and a lens array A) and the light guiding unit LG in the document conveying direction are reversed between the first image sensor 21 and the second image sensor 22, there is a problem that it is difficult to detect a leading end and a trailing end of the original document. Specifically, when the arrangement orders are reversed, the imaging elements of one of the first image sensor 21 and the second image sensor 22 receives reflected light which is reflection of light emitted from the upstream side to the downstream side in the document conveying direction, while, the imaging elements of the other one of the first image sensor 21 and the second image sensor 22 receives reflected light which is reflection of light emitted from the downstream side to the upstream side in the document conveying direction. As a result, different positions are detected as an end of the original document by the first image sensor 21 and the second image sensor 22. Thus, the precise detection of the leading end and the trailing end of the original document becomes difficult. This problem is particularly significant when a document subject to scanning is thick. Meanwhile, a light source LS of each the first image sensor 21 and the second image sensor 22 is disposed on a side end on which the connectors 21E or the connector 22E is located in the front-rear direction as shown in FIGS. 4A and 4B. The light emitted from the light source LS is transmitted in the longitudinal direction of the first and second image sensors 21 and 22 by the light guiding unit LG.

In view of the above problem, in order to arrange the first and second image sensors 21 and 22 with making the arrangement orders of the array of the imaging elements and the light guiding unit of the first image sensor 21 and that of the second image sensor 22 coincide with each other, the first image sensor 21 is arranged such that a connector 21E is located on the rear side and the second image sensor 22 is arranged such that a connector 22E is located on the front side as depicted in FIGS. 4A, 4B and 5. It is noted that an arrow G in FIGS. 4A and 4B indicates the document conveyor path. The first image sensor 21 is arranged below the document conveyor path as depicted in FIG. 4A, and the second image sensor 22 is arranged above the document conveyor path as depicted in FIG. 4B.

As depicted in FIG. 5, the connector 21E and the connector 22E are respectively connected with electric cables 49 and 60 (e.g., flexible flat cables). The electric cables 49 and 60 are connected to the processing unit 100 of the image forming unit 2 passing through vicinity of the hinges 10. Although not shown in FIG. 5, the electric cable 49 connected to the connector 21E on the rear side of the first image sensor 21 extends along a movable range of the first image sensor 21 of the image reader unit 3, and is connected to the image forming unit 2 along with the electric cable 60.

The electric cable 60 connected with the second image sensor 22E on the front side of the second image sensor 22 extends to across above the second image sensor 22 in the front-rear direction and is connected to the image forming unit 2 along with the electric cable 60 passing through the vicinity of the hinges 10 on the left side.

Hereinafter, an arrangement of the electric cable will be described in detail. As depicted in FIG. 5, the electric cable 60 includes an end portion 61 which is connected with the connector 22E and folded to form an accordion portion above the connector 22E. When the document cover 4 is in the open position as depicted in FIG. 1B, an operator, such as a service person, may remove the second transparent portion 28 and take out the second image sensor 22 with unfolding the end portion 61. According to this configuration, the service person may replace the second image sensor 22 easily.

Returning to FIG. 5, the electric cable 60 includes a horizontal portion 62, which is connected with the end portion 61 and horizontally extends, in the front-rear direction, above the second image sensor 22. The horizontal portion 62 is supported by an upper surface of a casing 90 (see FIG. 7) which accommodates the second image sensor 22. A portion of the electric cable 60 connected with a rear end of the horizontal portion 62 is folded perpendicularly twice to form a trapezoidal folding back portion 63. The electric cable 60 further includes a hung portion 61 which extends from the folding back portion 63 to the processing unit 200 and is drooped towards the image reader unit 3.

Figure 6:
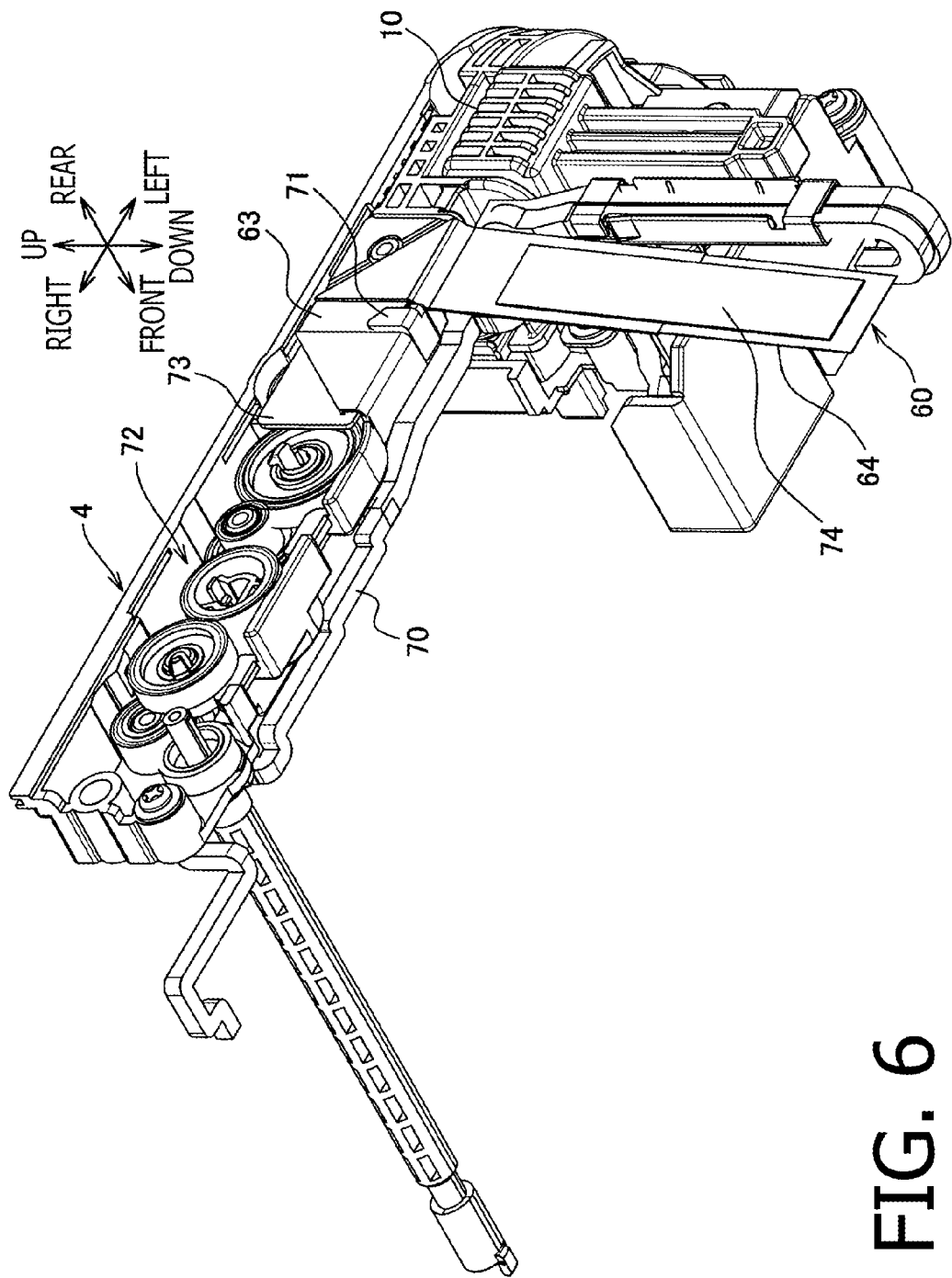
FIG. 6 is a perspective view showing the arrangement of the electric cable in a rear side of the image reader unit.

As depicted in FIG. 6, the folding back portion 63 is arranged on the rear side of a rear end frame 70 of the document cover 4 and hooked on a hook 71 formed on the rear end frame 70. The rear end frame 70 rotatably supports a chain of gears 72 which transmit driving force to the rollers such as the reverse conveyer roller 44. On a surface of the folding back portion 63 facing the chain of gears 72, a protection plate 73 (e.g., a resin film such as PET) is attached with a two-sided adhesive tape (not shown). The protection plate 73 prevents the electric cable 60 from contacting the chain of gears 72. Additionally, to the hung portion 64, an attaching member 74 (e.g., a resin film such as PET) is attached at a position slightly displaced from a connected portion with the folding back portion 63.

The hinges 10 are movable with respect to the image reader unit 3 in the front-rear direction and rotatably supports the document cover 4. According to this configuration, the document cover 4 may press the original document such as a single paper placed on the transparent portion 25 when it moves down with the hinges 10 to a down position as depicted in FIG. 6A. Additionally, as depicted in FIG. 6B, the document cover 4 moves up with the hinges 10 to an upper position so that the document cover 4 may press the original document such as a book loaded on the transparent portion 25, which is relatively thick in the up and down direction. The attaching member 74 makes the hung portion 64 be inserted into and removed from the image reader unit smoothly when the document cover 4 being moved in the up-down direction.

Configuration for Supporting the Electric Cable in the Image Reader Unit

Hereinafter, a configuration of the casing 90 which supports the electric cable 60 (particularly, the horizontal portion 62) in the document cover 4 will be described in detail. As depicted in FIG. 7, the casing 90 has a box-like shape with longer sides being in the front-rear direction (i.e., a depth direction of FIG. 7). The lower end of the casing 90 is opened, and the second transparent portion 28 is removably attached to the lower end of the casing 90. The second image sensor 22 is disposed on the second transparent portion 28. That is, the second image sensor 22 is disposed inside the casing 90. An upper surface 91 of the casing 90 is a horizontal plane. The upper surface 91 is spaced from the upper surface of the chassis of the second image sensor 22 (i.e., the reverse surface of the reading surface). Each of paired guide members 93 is formed on each side of the upper surface 91 in the right-left direction. The horizontal portion 62 of the electric cable 60 is disposed between the paired guide members 93 on the upper surface 91. Meanwhile, an opening, which is not shown in the accompanying drawings, is formed on the casing 90. In a state where the second image sensor 22 is appropriately positioned in the casing 90, the opening is located near the connector 22E of the second image sensor 22. Additionally, the guide members 93 do not exist on the upper side of the opening. Therefore, the electric cable 60 connected with the connector 22E of the second image sensor 22 in the casing 90 may be put outside the casing 90 through the opening, and extended along the upper surface 91 of the casing 90 from the upper side of the opening on which no guide members 93 exists.

Thus, in the present embodiment, the electric cable 60 can be arranged easily by extending the electric cable 60 in the front-rear direction (i.e., the longitudinal direction of the second image sensor 22) through a space formed on a rear side of the second image sensor 22. Additionally, since the horizontal part 62 of the electric cable 60 is held between the paired guide members 93, the electric cable 60 can be stably-supported.

Further, the casing 90 is made of resin, and the upper surface 91 is spaced from the rear surface of the second image sensor 22. Therefore, interference of electric signals between the horizontal portion 62 of the electric cable 60 and the second image sensor 22 can be suppressed, and it can reduce noise added to data of an image which has been read. Additionally, since the horizontal part 62 is held between the paired guide members 93, a long creepage distance through which the static electricity may be transmitted from the second image sensor 22 to the horizontal part 62 can be maintained. Thus, the noise added to the data of the image which has been read can be further reduced.

Figure 8:
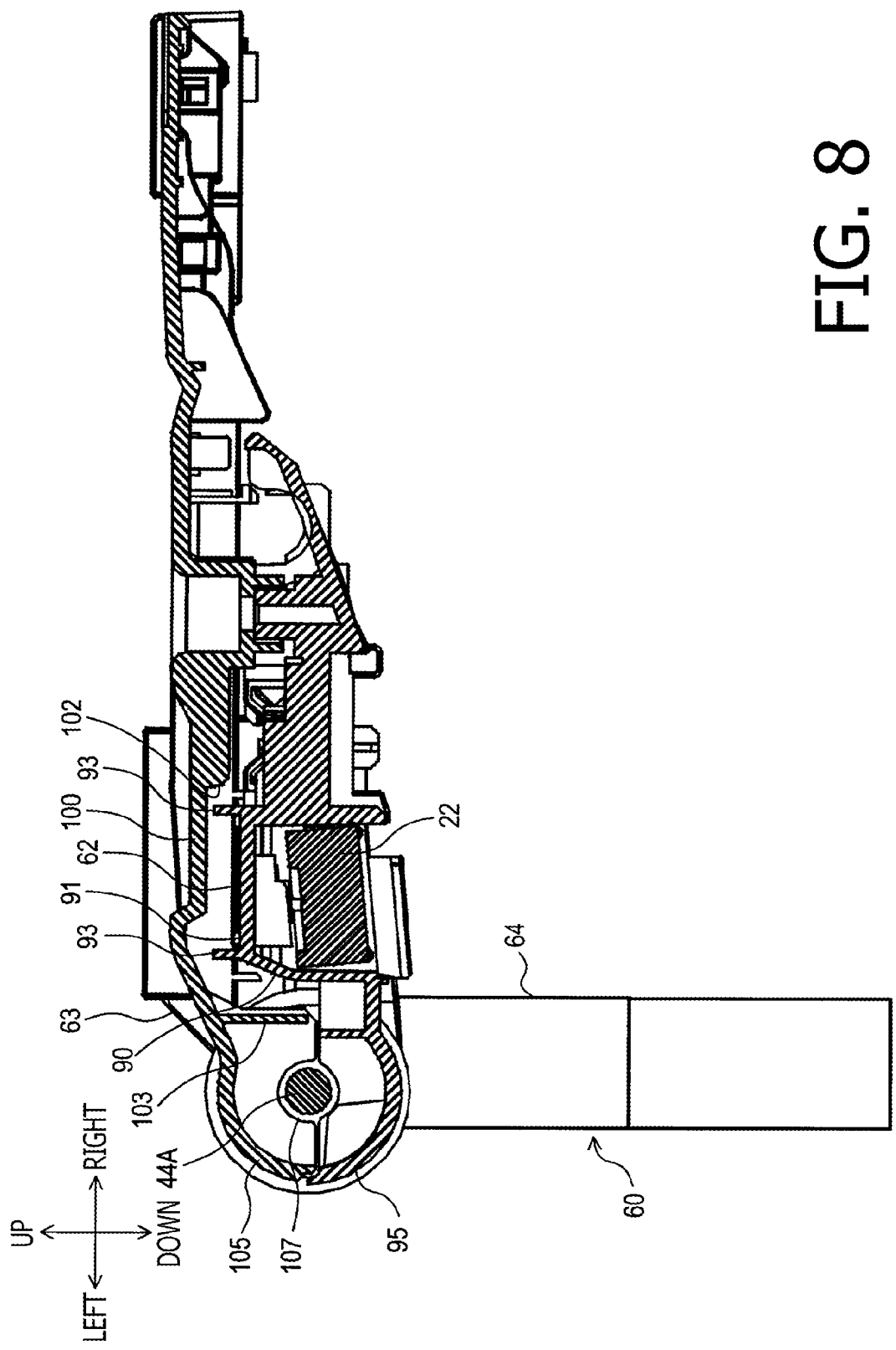
FIG. 8 is a cross-sectional side view showing a configuration of the casing and a conveyance unit cover.

Further, as depicted in FIG. 3, the horizontal portion 62 is covered with a conveyance unit cover 100 along with the rollers such as the reverse conveyance roller 44 and the casing 90. This configuration can also suppress the transmission of the static electricity from the second image sensor 22 to the horizontal portion 62. It is noted that FIG. 8 shows a cross-sectional surface which is shifted from the cross-sectional surface shown in FIG. 3 in the front-rear direction. In the embodiment, the plurality of reverse conveyance rollers 44 are attached to a shaft 44A extending in the front-rear direction with a predetermined interval. Thus, FIG. 3 includes a cross-sectional surface of the reverse conveyance roller 44 while FIG. 8 does not include the cross-sectional surface of the reverse conveyance roller 44.

As depicted in FIG. 8, the conveyance unit cover 100 has an wall 102 on the right side of the guiding member 93 disposed on the right side of the casing 90, and a vertical rib 103 on the left side of the guiding member 93 disposed on the left side of the casing 90. Additionally, the left end portion of the casing 90 extends beyond the shaft 44A of the reverse conveyance roller 44. The left end portion 105 of the conveyance unit cover 100 also extends beyond the shaft 44A. The left end portion 105 of the conveyance unit cover 100 is connected with the left end portion 95 of the casing 90 so as to cover the shaft 44A from the outer circumference. A shaft bearing 107 of the shaft 44A is connected with the left end portion 105 of the conveyance unit cover 100.

As described above, in the present embodiment, the upper surface 91 of the casing 90 and the paired guide members 93 are covered from the rear side and the outside in the document conveying direction (i.e., from the upper side of the document cover 4 and the downstream side in the document conveyance direction) with the conveyance unit cover 100. Therefore, a longer creepage distance through which the static electricity may be transmitted from the second image sensor 22 to the horizontal part 62 can be maintained, and the noise added to the data of the image which has been read can be further reduced. Further, as depicted in FIG. 8, the conveyance unit cover 100 covers the casing 90 in a wide range, the transmission of the static electricity generated by the chain of gears 72 and the like, to the electric cable 60 can also be suppressed.

Only an exemplary embodiment of the disclosure and a few examples of their versatility are shown and described in the disclosure. It is to be understood that the disclosure is capable of use in various other combinations and environments and is capable of changes or modifications within the scope of the inventive concept as expressed herein. For example, the electric cable is not limited to the flexible flat cable but also various types of electric cables can be used.

Further, in the above embodiment, the same image sensors are employed for the first image sensor 21 and the second image sensor 22. However, the present invention is not limited to such a configuration. Specifically, image sensors made by different manufactures may be employed respectively for the first image sensor 21 and the second image sensor 22 if positional relationships of components, such as an array of imaging elements, a light guiding unit and a connector therebetween are the same. For example, an image sensor manufactured by Company A may be employed for the first image sensor 21, and an image sensor manufactured by Company B may be employed for the second image sensor 22.

What is claimed is:

1. An image reading apparatus comprising:
   a conveyance unit configured to convey original documents in a document conveying direction;
   a first reader unit including a first array of imaging elements in which imaging elements are aligned in a predetermined direction, a first light guiding unit arranged parallelly with the first array of imaging elements and a first connector disposed in one end of the first array of imaging elements, the first reader unit being configured to read an image from one side of the original document conveyed by the conveyance unit with the first array of imaging elements;
   a second reader unit including a second array of imaging elements in which imaging elements are aligned in the predetermined direction, a second light guiding unit arranged parallelly with the second array of imaging elements and a second connector disposed in one end of the second array of imaging elements, a positional relationship of the second array of imaging elements, the second light guiding unit and the second connector being the same as a positional relationship of the first array of imaging elements, the first light guiding unit and the first connector, and the second reader unit being arranged such that the second connector and the first connector are located at opposite side ends in the predetermined direction;
   a first electric cable connected to the first connector and configured to transmit signals from the first array of imaging elements;
   a second electric cable connected to the second connector and configured to transmit signals from the second array of imaging elements; and
   a supporting unit configured to support one of the first electric cable and the second electric cable along the predetermined direction such that the first electric cable and the second electric cable become aligned together.

2. The image reading apparatus according to claim 1, wherein the supporting unit is configured such that the one of the first and the second electric cables is spaced from one of the first and the second reader units.

3. The image reading apparatus according to claim 1, wherein:
   the supporting unit includes a pair of guide members; and
   the guide members hold the one of the first and the second electric cables from an upstream side and a downstream side in the document conveying direction.

4. The image reading apparatus according to claim 3, further comprising a cover,
   wherein the cover is configured to cover the guide members and the supporting unit from an upper side and cover the guide members from the downstream side in the document conveying direction.

5. An image reading apparatus comprising:
   a conveyance unit configured to convey original documents in a document conveying direction;
   a first reader unit and a second reader unit, each of the first reader unit and the second reader unit including an array of imaging elements in which imaging element are aligned in a predetermined direction, a light guiding unit arranged parallelly with the array of imaging elements and a connector disposed in one end of the array of imaging elements, the first reader unit being configured to read an image from one side of the original document conveyed by the conveyance unit with the array of imaging elements, and the first reader unit and the second reader unit being arranged such that the connectors are located at opposite side ends in the predetermined direction;
   a first electric cable connected to the connector of the first reader unit and configured to transmit signals from the array of imaging elements of the first reader unit;
   a second electric cable connected to the connector of the second reader unit and configured to transmit signals from the array of imaging elements of the second reader unit; and
   a supporting unit configured to support one of the first electric cable and the second electric cable along the predetermined direction such that the first electric cable and the second electric cable become aligned together.

* * * * *